United States Patent
Butts

(10) Patent No.: US 10,152,536 B2
(45) Date of Patent: *Dec. 11, 2018

(54) SUGGESTED APPLICATION DOWNLOAD

(71) Applicant: Sonos, Inc., Santa Barbara, CA (US)

(72) Inventor: Christopher D. Butts, Evanston, IL (US)

(73) Assignee: Sonos, Inc., Santa Barbara, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 14/853,350

(22) Filed: Sep. 14, 2015

(65) Prior Publication Data
US 2016/0004709 A1 Jan. 7, 2016

Related U.S. Application Data

(63) Continuation of application No. 14/318,075, filed on Jun. 27, 2014, now Pat. No. 9,535,986.

(51) Int. Cl.
*G06F 3/16* (2006.01)
*G06F 17/30* (2006.01)
(Continued)

(52) U.S. Cl.
CPC ......... *G06F 17/3074* (2013.01); *G05B 15/02* (2013.01); *G06F 3/0482* (2013.01);
(Continued)

(58) Field of Classification Search
CPC .................................................. G06F 3/0482
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 0153994 7/2001
(Continued)

OTHER PUBLICATIONS

Non-Final Office Action dated Aug. 9, 2016, issued in connection with U.S. Appl. No. 14/318,075, filed Jun. 27, 2014, 10 pages.
(Continued)

*Primary Examiner* — Cao H Nguyen
(74) *Attorney, Agent, or Firm* — McDonnell Boehnen Hulbert & Berghoff LLP

(57) ABSTRACT

An example implementation involves a controller device detecting a first input in a control interface of a first application. Based on the first input, the controller device sends over a local area network (LAN) to a media playback system, a command that instructs the media playback system to play back media provided by a first streaming audio service. The controller device displays, in the control interface of the first application, an indication of a suggested second application that is operable to provide access to a second streaming audio service that is different from the first streaming media service. The controller device detects a second input in the first application, wherein the second input comprises a selection of the suggested second application. Based on the second input, the controller device downloads the second application to data storage of the controller device.

20 Claims, 10 Drawing Sheets

(51) Int. Cl.

| | |
|---|---|
| *G06F 3/0481* | (2013.01) |
| *G05B 15/02* | (2006.01) |
| *H04L 29/06* | (2006.01) |
| *G06F 3/0482* | (2013.01) |
| *G06F 3/0484* | (2013.01) |
| *H04L 29/08* | (2006.01) |
| *H04W 4/04* | (2009.01) |
| *G06F 3/0488* | (2013.01) |

(52) U.S. Cl.
CPC ........ *G06F 3/0488* (2013.01); *G06F 3/04817* (2013.01); *G06F 3/04842* (2013.01); *G06F 3/04847* (2013.01); *G06F 3/165* (2013.01); *G06F 17/30769* (2013.01); *H04L 65/4084* (2013.01); *H04L 65/4092* (2013.01); *H04L 65/601* (2013.01); *H04L 67/20* (2013.01); *H04L 67/34* (2013.01); *H04W 4/043* (2013.01); *G06F 2200/1614* (2013.01); *G06F 2203/04803* (2013.01)

(58) Field of Classification Search
USPC .................... 715/716, 763–765, 851–853
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,248,946 | B1 | 6/2001 | Dwek |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalsky et al. |
| 6,757,517 | B2 | 6/2004 | Chang |
| 6,763,040 | B1 | 7/2004 | Hite et al. |
| 6,778,869 | B2 | 8/2004 | Champion |
| 6,915,176 | B2 | 7/2005 | Novelli et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,797,471 | B2 | 9/2010 | Laefer et al. |
| 7,853,341 | B2 | 12/2010 | McCarty et al. |
| 7,920,824 | B2 | 4/2011 | Janik et al. |
| 7,987,294 | B2 | 7/2011 | Bryce et al. |
| 7,995,899 | B2 | 8/2011 | Heredia et al. |
| 8,014,423 | B2 | 9/2011 | Thaler et al. |
| 8,045,952 | B2 | 10/2011 | Qureshey et al. |
| 8,050,652 | B2 | 11/2011 | Qureshey et al. |
| 8,103,009 | B2 | 1/2012 | McCarty et al. |
| 8,234,395 | B2 | 7/2012 | Millington et al. |
| 8,271,114 | B2 | 9/2012 | Lydon et al. |
| 8,483,853 | B1 | 7/2013 | Lambourne |
| 8,595,793 | B2 | 11/2013 | Kashyap et al. |
| 9,552,816 | B2 | 1/2017 | Vanlund et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0159414 | A1* | 7/2006 | Wolf ............... G11B 27/034 386/282 |
| 2007/0142944 | A1 | 6/2007 | Goldberg et al. |
| 2009/0290725 | A1 | 11/2009 | Huang |
| 2009/0327920 | A1* | 12/2009 | Lemay .................. G06F 3/0482 715/752 |
| 2011/0265003 | A1 | 10/2011 | Schubert et al. |
| 2012/0070017 | A1 | 3/2012 | Dorogusker et al. |
| 2012/0079126 | A1 | 3/2012 | Evans et al. |
| 2013/0279878 | A1 | 10/2013 | Haverkamp |
| 2014/0075308 | A1* | 3/2014 | Sanders ............ G06F 17/30772 715/716 |
| 2014/0123004 | A1 | 5/2014 | Chaudhri et al. |
| 2014/0123006 | A1 | 5/2014 | Chen et al. |
| 2014/0331332 | A1 | 11/2014 | Arrelid et al. |
| 2015/0066494 | A1 | 3/2015 | Salvador et al. |

FOREIGN PATENT DOCUMENTS

| | | |
|---|---|---|
| WO | 2003093950 A2 | 11/2003 |
| WO | 2011019775 | 2/2011 |

OTHER PUBLICATIONS

Notice of Allowance dated Nov. 3, 2016, issued in connection with U.S. Appl. No. 14/318,075, filed Jun. 27, 2014, 5 pages.
International Bureau, International Preliminary Report on Patentability dated Jan. 5, 2017, issued in connection with International Application No. PCT/US2015/032995, filed on May 28, 2015, 11 pages.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
AudioTron, "Digital Music Player for Home Networks," 2002.
AudioTron "Reference Manual," 2002.
Bluetooth. "Specification of the Bluetooth System: The ad hoc SCATTERNET for affordable and highly functional wireless connectivity" Core, Version 1.0 A, Jul. 26, 1999, 1068 pages. (in four parts due to size).
Bluetooth. "Specification of the Bluetooth System: Wireless connections made easy" Core, Version 1.0 B, Dec. 1, 1999, 1076 pages. (in four parts due to size).
Dell, Inc. "Dell Digital Audio Receiver: Reference Guide" Jun. 2000, 70 pages. (in two parts due to size).
Dell, "Start Here".
Higgins, "Design for Digital Music," 2014.
Jo, et al., "Synchronized one-to-many media streaming with adaptive playout control," Department of Information and Communications.
Jones, "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages.
Louderback, "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages.
Microsoft, "Universal Plug and Play Device Architechture," 2000.
Palm, Inc. "Handbook for the Palm VII Handheld" May 2000, 311 pages.
International Searching Authority, International Search Report and Written Opinion dated Jul. 30, 2015, issued in connection with International Application No. PCT/US2015/032995, filed on May 28, 2015, 14 pages.

(56) References Cited

OTHER PUBLICATIONS

European Patent Office, European Extended Search Report dated Nov. 20, 2017, issued in connection with EP Application No. 15811588.1, 6 pages.

* cited by examiner

US 10,152,536 B2

SUGGESTED APPLICATION DOWNLOAD

CROSS REFERENCE TO RELATED APPLICATIONS

This application is a continuation of U.S. non-provisional patent application Ser. No. 14/318,075, filed on Jun. 27, 2014, entitled "Application Launch," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 7A and 7B show further example interfaces in which aspects of certain embodiments may be practiced;

Figure 1:
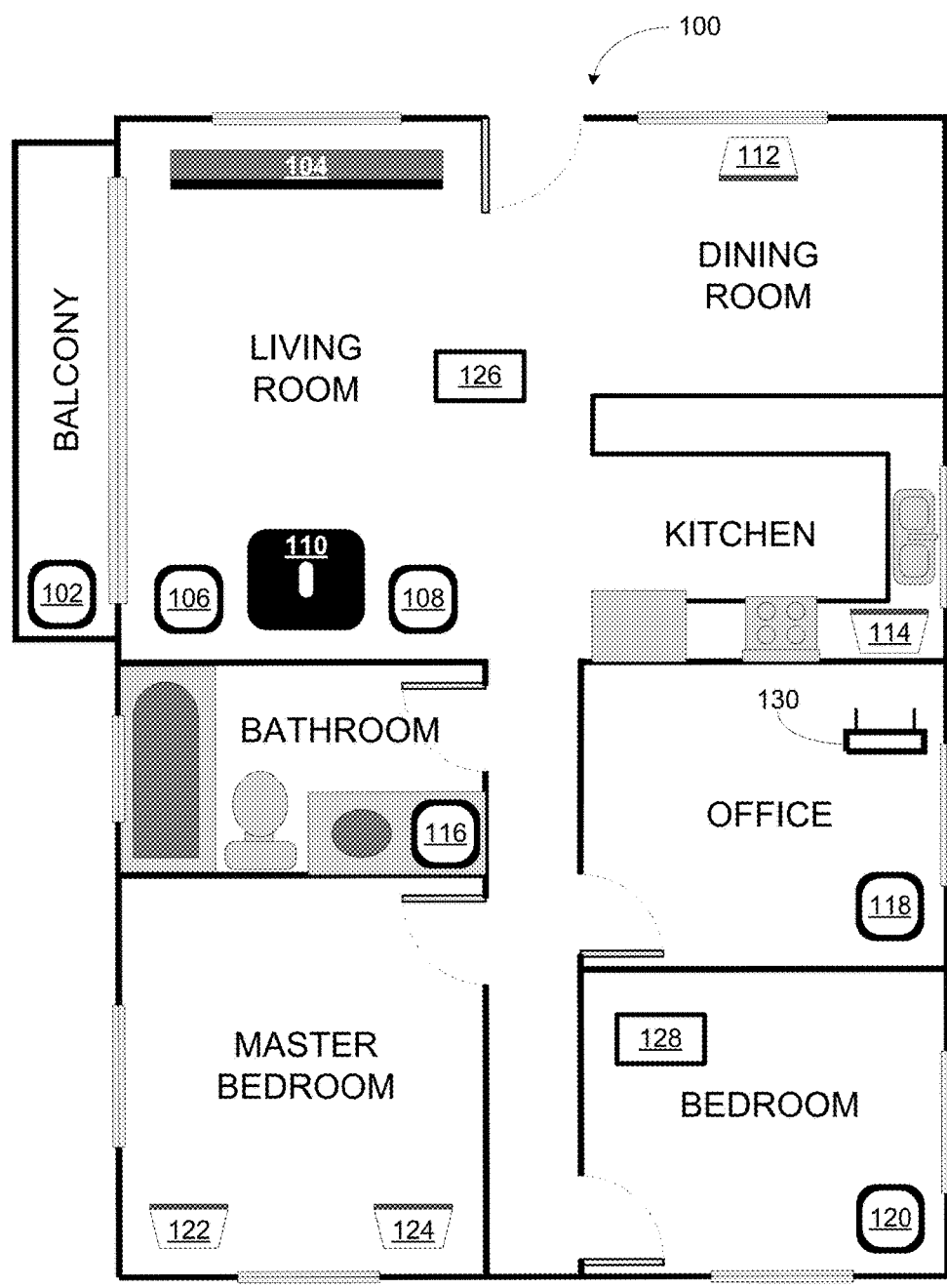
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some examples described herein may involve using a first application to launch a second application. In one particular example, a first application may include controls (e.g., transport controls) for controlling a media playback system, among other features. In some cases, the first application may also provide an interface that includes controls to access various streaming audio services, each of which may provide streaming audio (e.g., streaming audio tracks) to the media playback system. For example, the interface may include one or more controls for selecting a streaming audio service. After detecting a selection of a third-party streaming audio service, the interface may display audio tracks of the selected third-party streaming audio service, such that they may be selected for addition to a playback queue of the media playback system. The media playback system may ultimately stream the audio tracks in the playback queue from the streaming audio service to playback the audio tracks.

In some cases, an application other than the first application (i.e., a second application) may be capable of controlling the media playback system. Such an application may be one of several different second applications that are capable of controlling the media playback system, perhaps in different ways. For instance, a second application may include controls for selecting audio tracks of the streaming audio service to add to a playback queue of the media playback system. The second application may also include transport controls for controlling the media playback system, among other features. Such a second application may provide access to the streaming audio service that is different (e.g., customized to the service, or otherwise different) to the streaming audio service than the access provided by the first application. Further, the controls in the second application may allow use of a familiar interface to access the streaming audio service via the second application, while at the same time enabling playback of streaming audio on the media playback system.

A second application may affect playback of the media playback system in various ways. For instance, affecting playback of the media playback system may involve adjusting the equalization of media items played back by the media playback system. Then, in operation, the first application may provide transport controls for controlling playback of the media playback system and/or controls for selecting audio tracks for playback on the media playback, while the second application affects playback of the media playback system. Alternatively, the second application may provide transport controls and affect playback of the media playback system.

The first application on a computing device may facilitate access to various second applications. In one example, the computing device may include a graphical display. On the graphical display, the computing device may display an interface of the first application. On the interface, the first application may display indications of one or more second applications, such as in a list of available second applications to facilitate selection of one second application. The computing device may then detect a selection of a particular second application. Based on the detection, the computing device may execute the selected second application. In executing the selected second application, the computing device may cause display of an interface of the selected second application on the graphical display. The computing device may also cause display of a control for controlling the media playback system within the interface of the selected second application. In this way, the computing system may facilitate control of the media playback system by the third-party application.

In some cases, the computing system may suggest certain applications (e.g., one or more second applications) or services associated with those applications. To do so, the computing system may track selections of streaming audio services. For instance, the computing system may track selections of second applications associated with respective streaming audio services. Based on these tracked selections, the computing system may determine one or more suggested streaming audio services that are similar to the selected streaming audio services. The computing system may then display an indication of the suggested streaming audio service. For instance, the computing system may display an indication of a second application that provides access to the suggested streaming audio service. Then, for example, the computing system may receive a selection of the second application and then control one or more aspects of the media playback system by way of the second application.

As indicated above, the present application involves first applications and second applications. In one aspect, a method is provided. The method involves displaying, on the graphical display, an interface of a first application, where the interface of the first application includes (i) an indication of one or more second applications and (ii) at least one first control for controlling playback on a media playback system, where the media playback system includes at least one playback device. The method also involves detecting a selection of one of the one or more second applications. Based on detecting the selection of one of the one or more second applications, the method further involves: installing the selected second application on the computing device, and after installing the selected second application, executing the selected second application, where execution of the selected second application involves: displaying, on the graphical display of the computing device, an interface of the selected second application, where the interface of the selected second application includes at least one second control for controlling playback on the media playback system.

In another aspect, a device is provided. The device includes a network interface, a graphical display, a processor, a data storage; and a program logic stored in the data storage and executable by the processor to perform functions. The functions include displaying, on the graphical display, an interface of a first application, where the interface of the first application includes (i) an indication of one or more second applications and (ii) at least one first control for controlling playback on a media playback system, where the media playback system includes at least one playback device. The functions also include detecting a selection of one of the one or more second applications. Based on detecting the selection of one of the one or more second applications, the function further include: installing the selected second application on the computing device; and after installing the selected second application, executing the selected second application, where execution of the selected second application involves: displaying, on the graphical display of the computing device, an interface of the selected second application, where the interface of the selected second application includes at least one second control for controlling playback on the media playback system.

In yet another aspect, a non-transitory computer readable memory is provided. The non-transitory computer readable memory has stored thereon instructions executable by a computing device to cause the computing device to perform functions. The functions include displaying, on the graphical display, an interface of a first application, where the interface of the first application includes (i) an indication of one or more second applications and (ii) at least one first control for controlling playback on a media playback system, where the media playback system includes at least one playback device. The functions also include detecting a selection of one of the one or more second applications. Based on detecting the selection of one of the one or more second applications, the function further include: installing the selected second application on the computing device; and after installing the selected second application, executing the selected second application, where execution of the selected second application involves: displaying, on the graphical display of the computing device, an interface of the selected second application, where the interface of the selected second application includes at least one second control for controlling playback on the media playback system.

In an aspect, a second method is provided. The second method involves displaying, on a graphical display of a computing device, an interface of a first application, where the interface of the first application includes (i) an indication of one or more second applications and (ii) at least one first control for controlling playback on a media playback system, where the media playback system includes at least one playback device. The method also involves detecting, by the computing device, a selection of one of the one or more second applications. Based on detecting the selection of one of the one or more second applications, the method further involves executing, by the computing device, the selected second application, where execution of the selected second application involves modifying playback of media by the media playback system according to a playback-setting of the selected second application.

In another aspect, a second device is provided. The second device includes a network interface, a graphical display, a processor, a data storage, and a program logic stored in the data storage and executable by the processor to perform functions, the functions include displaying, on a graphical display of a computing device, an interface of a first application, where the interface of the first application includes (i) an indication of one or more second applications and (ii) at least one first control for controlling playback on a media playback system, where the media playback system includes at least one playback device. The functions also include detecting, by the computing device, a selection of one of the one or more second applications. Based on detecting the selection of one of the one or more second applications, the functions also include executing, by the computing device, the selected second application, where execution of the selected second application involves modifying playback of media by the media playback system according to a playback-setting of the selected second application.

In yet another aspect, a second non-transitory computer readable memory is provided. The non-transitory computer readable memory has stored thereon instructions executable by a computing device to cause the computing device to perform functions. The functions include displaying, on a graphical display of a computing device, an interface of a first application, where the interface of the first application includes (i) an indication of one or more second applications and (ii) at least one first control for controlling playback on a media playback system, where the media playback system includes at least one playback device. The functions also include detecting, by the computing device, a selection of one of the one or more second applications. Based on detecting the selection of one of the one or more second applications, the functions also include executing, by the computing device, the selected second application, where execution of the selected second application involves modifying playback of media by the media playback system according to a playback-setting of the selected second application.

In an aspect, a third method is provided. The third method involves detecting, within an interface of a first application, at least one respective selection of one or more streaming audio services, where the interface includes controls for controlling playback on a media playback system, and where the media playback system includes at least one playback device. Based on the at least one respective selection of the one or more streaming audio services, the method also involves identifying a streaming-audio-service characteristic; based on the identified streaming-audio-service characteristic. The method further involves determining a suggested streaming audio service, and displaying, on the interface, an indication of the determined suggested streaming audio service.

In another aspect, a third device is provided. The third device includes a network interface, a graphical display, a processor, a data storage, and a program logic stored in the data storage and executable by the processor to perform functions. The functions include detecting, within an interface of a first application, at least one respective selection of one or more streaming audio services, where the interface includes controls for controlling playback on a media playback system, and where the media playback system includes at least one playback device. Based on the at least one respective selection of the one or more streaming audio services, the functions also include identifying a streaming-audio-service characteristic; based on the identified streaming-audio-service characteristic. The functions further include determining a suggested streaming audio service, and displaying, on the interface, an indication of the determined suggested streaming audio service.

In yet another aspect, a third non-transitory computer readable memory is provided. The non-transitory computer readable memory has stored thereon instructions executable by a computing device to cause the computing device to perform functions. The functions include detecting, within an interface of a first application, at least one respective selection of one or more streaming audio services, where the interface includes controls for controlling playback on a media playback system, and where the media playback system includes at least one playback device. Based on the at least one respective selection of the one or more streaming audio services, the functions also include identifying a streaming-audio-service characteristic; based on the identified streaming-audio-service characteristic. The functions further include determining a suggested streaming audio service, and displaying, on the interface, an indication of the determined suggested streaming audio service.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
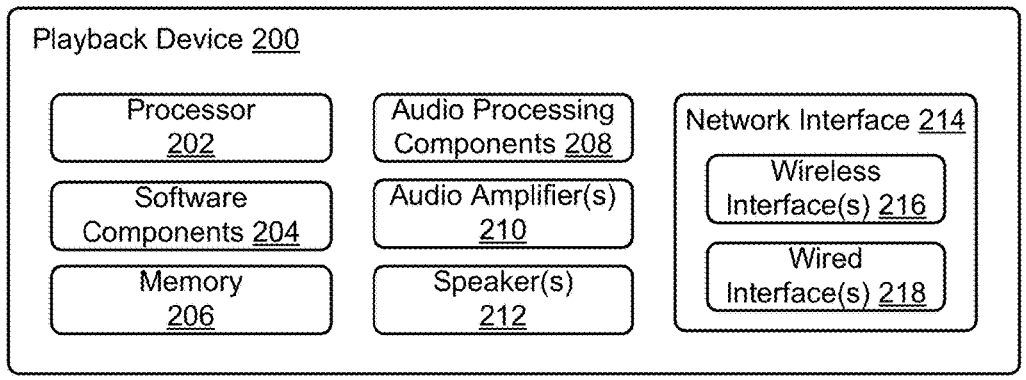
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
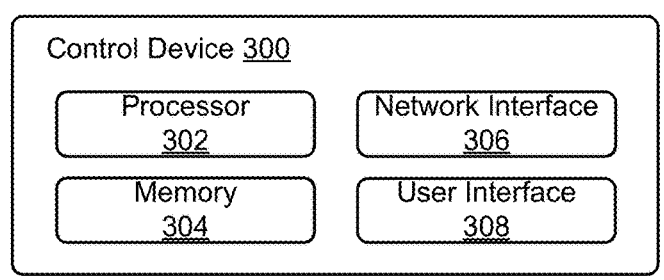
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
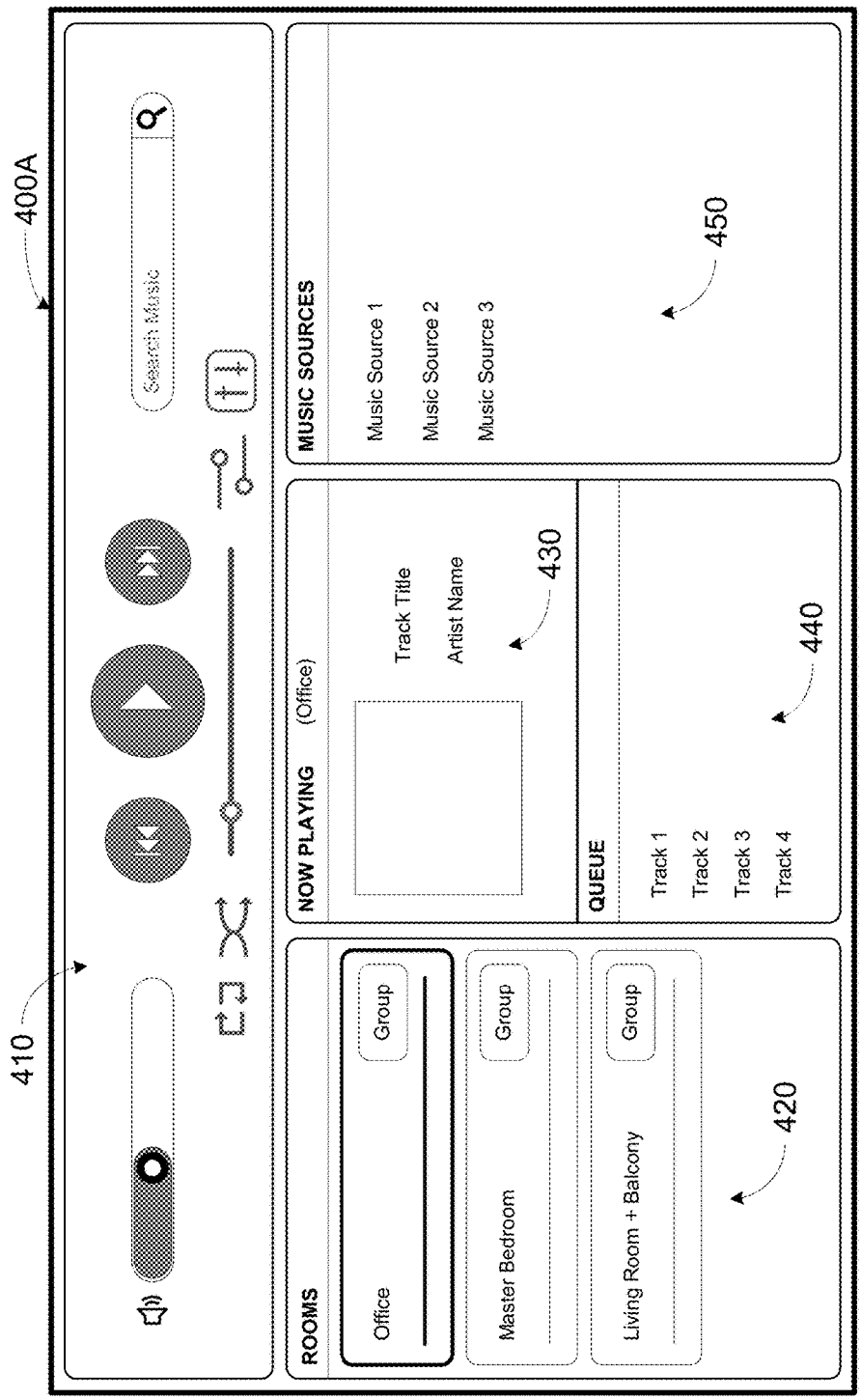
FIG. 4 shows an example controller interface.

The user interface 308 of the control device 300 may be configured to facilitate user access and control of the media playback system 100, by providing a controller interface such as the controller interface 400A shown in FIG. 4. The controller interface 400A includes a playback control region 410, a playback zone region 420, a playback status region 430, a playback queue region 440, and an audio content sources region 450. The user interface 400A as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400A are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400A.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400A of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Method To Launch an Application

As discussed above, embodiments described herein may involve first applications and second applications. An example method may facilitate control of a media playback system by a third-party application.

Figure 5:
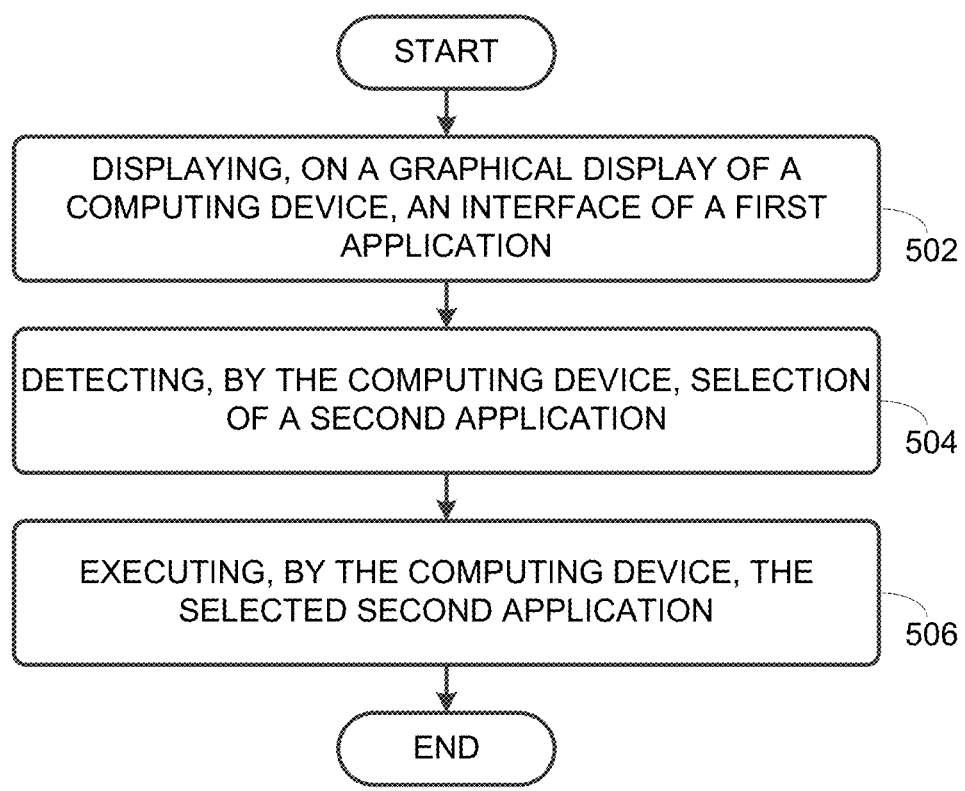
FIG. 5 shows an example flow diagram for launching an application for media playback system control.

Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

a. Displaying an Interface of a First Application

At block 502, the method involves displaying an interface of a first application. A computing device, such as control device 300, may display the interface on a graphical display, such as a graphical display coupled to or integrated into control device 300. Such an interface may include one or more controls for controlling playback on a media playback system. As noted above, such a media playback system may include at least one playback device that is communicatively coupled to a control device, such as control device 300 of FIG. 3.

In some implementations, the interface may include at least one first control for controlling playback on a media playback system. For instance, the interface may include one or more aspects of user interface 400A, such as a playback control region 410, a playback zone region 420, a playback status region 430, a playback queue region 440, and an audio content sources region 450. Such regions may include controls for controlling various aspects of a media playback system. Input received in such regions may cause transmission of a command corresponding to the input over a network to at least one playback device, such that the at least one playback device responds to the command.

For instance, a playback control region 410 may include one or more transport controls for controlling the media playback system. The transport controls may include selectable buttons or other controls that cause playback to start (e.g., a play button), pause, or stop. Further, the transport controls may cause playback to skip ahead or skip back to a next media item or a previous media item, respectively. Other transport controls may provide other types of controls.

The first application may be provided by or otherwise linked to a first-party, such as the manufacturer of the media playback system. The first-party may provide such a first application for controlling the media playback system. For instance, the first-party may distribute the first application on a tangible, non-transitory computer-readable medium, such as a memory, DVD, CD, Blu-ray, and the like. In other cases, another party may provide and/or distribute the first application on behalf of the first party, perhaps according to a contractual relationship. In other cases, the first application may be provided by a party that is not a manufacturer of the media playback system.

The interface of the first application may include an indication of one or more second applications. Such second applications may be separate and distinct applications from the first application. The indications of the second applications may take a variety of forms such as a list of respective selectable icons or labels.

The second applications may provide access to services such as streaming media services or media curation services, among other examples. Such services may support a variety of playback devices, such as smartphones, tablets, personal computers, and the like. Support by these services may extend to media playback systems that include at least one playback device. Further, support for the media playback system may include compliance with an application programming interface (API), such that the first application can communicate with the second application in a manner defined by the API.

In one example, the second applications may provide access to a streaming audio service. Examples of streaming audio services may include such on-demand streaming audio services such as Spotify®, Rdio®, or Beats Music®, among others. Typically, installing a particular second application (e.g., a Spotify® application for a particular service such as Spotify®) on a computing device will provide access to the service on the computing device on which the application is installed. For instance, the second application may receive a selection of a particular song and then stream the song to the computing device for playback. Other examples of streaming audio services may include radio-type streaming audio service such as Pandora® Radio, Slacker® Radio, or iTunes Radio$^{SM}$, among others now or later available.

Figure 6A:
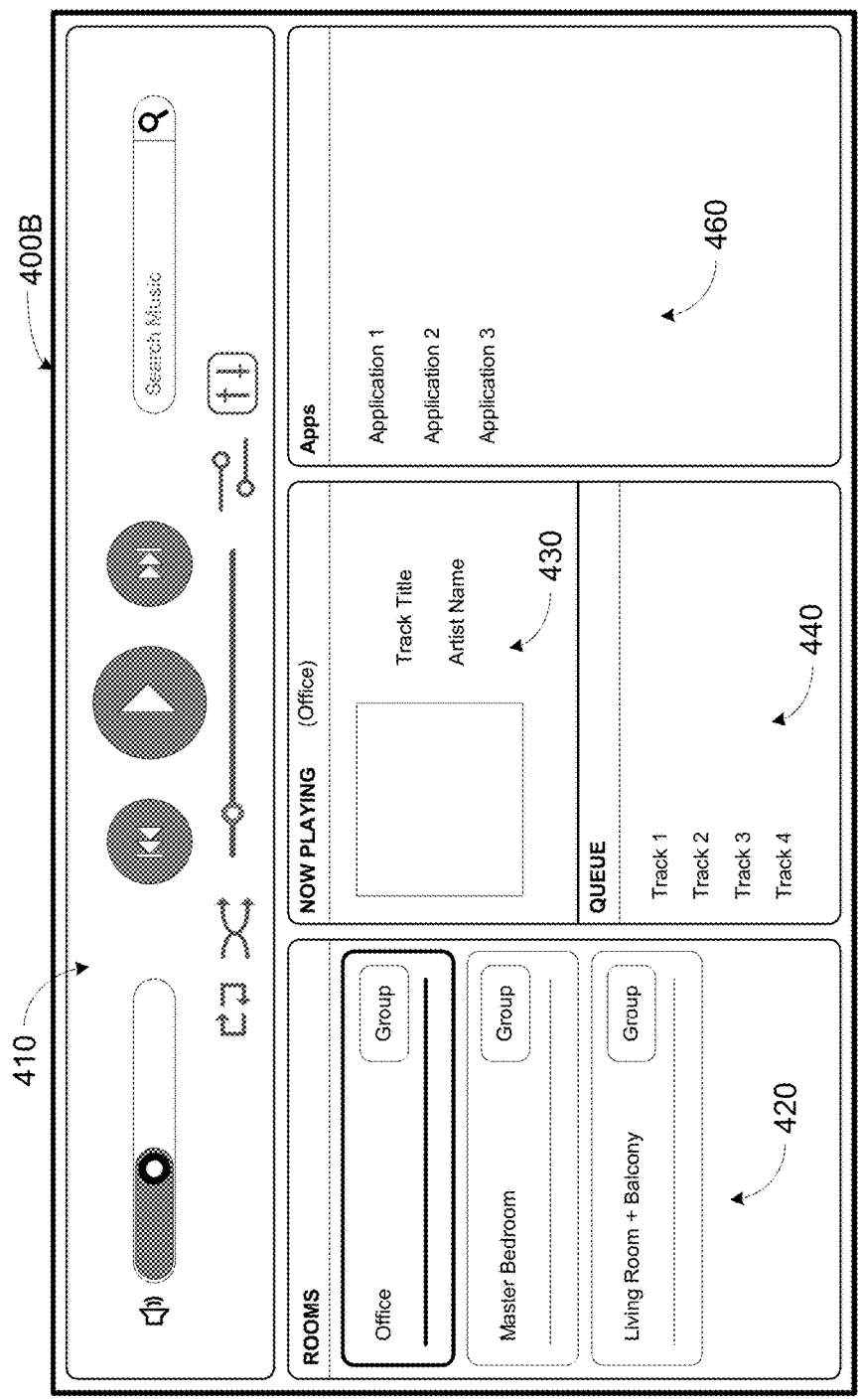
FIGS. 6A, 6B, and 6C show example interfaces in which aspects of certain embodiments may be practiced.

FIG. 6A shows an example interface 400B of the first application. Interface 400B is a variant of user interface 400A. Like user interface 400A, interface 400B includes a playback control region 410, a playback zone region 420, a playback status region 430, and a playback queue region 440. Interface 400B also includes an application selection region 460 that includes indications of second applications. Application selection region 460 includes indications of "Application 1", "Application 2", and "Application 3", which may correspond to respective applications for respective services.

FIG. 7A shows another example interface 700A which could be an implementation of the interface of the first application on a smartphone, or another similarly proportioned computing device. Example interface 700A includes a title region 702A, an application selection region 704A, and transport control region 706A. The title region 702A may inform a user that application selection region 704A of the interface 700A is presently displayed. Title region 702A may also provide navigation through interface 700A, such as by closing the application selection region 704A in response to detecting input at the "X". After closing the application selection region, the interface 700A may display a playback control region, a playback zone region, a playback status region, a playback queue region, and/or an audio content sources region, among other examples. The Apps selection region 704A includes indications of "Application 1", "Application 2", and "Application 3", which may correspond to respective applications for respective services. Transport control region 706A includes transport controls for controlling playback on the media playback system.

b. Detecting a Selection of One of One or more Second Applications

At block 504, the method involves detecting, by the computing device, a selection of one of the one or more second applications. The selection may involve the computing device receiving an indication of one of the one or more second applications. For instance, the computing device may receive input at an interface, such as user interface 308 of control device 300 in FIG. 3. The computing device may then detect such input and determine that the detected input is a selection of one of the one or more second applications.

In one example, the computing device may display the interface of the first application on a touch-sensitive display and then receive the selection of one of the one or more second applications by way of a touch input on the touch-sensitive display. In another example, the computing device may receive the selection one of the one or more second applications by way of a keyboard input, mouse input, and the like. In a further example, the computing device may receive the selection of one of the one or more second applications by way of voice input, such as by receiving the voice command of "Open Spotify®" or "Open Beats®", among other possible commands. Further, any suitable combination of any such example inputs, selections, and/or commands may be used as well.

The computing device may detect the selection within an application selection region. For example, referring back to FIGS. 6A, the computing device may detect an input within application selection region 460. Such an input may select one of "Third-Party Application 1", "Third-Party Application 2", or "Third-Party Application 3". As another example, referring back to FIG. 7A, the computing device may detect an input within application selection region 704A. Such an input may select one of "Third-Party Application 1", "Third-Party Application 2", or "Third-Party Application 3".

c. Executing the Selected Second Application

At block 506, the method involves executing the selected second application. The computing device may execute the selected second application based on detecting the selection of the one of the one or more second applications. For instance, in response to detecting the selection of the one of the one or more second application, the computing device may execute the selected second application. Executing the selected second application may involve a variety of functions, such as displaying an interface, controlling playback of the media playback device, or affecting playback of media items on the media playback system, among other examples.

As noted above, executing the selected second application may involve displaying, on the graphical display of the computing device, an interface of the selected second application. The interface may include various controls. As noted above, in some cases, the controls may provide the computing device with access to a streaming media service. Such access may include streaming media items from the streaming media service and playing back the media items on the computing device. The controls may also provide the media playback system with access to the streaming media service. Such access may include streaming media items from the streaming media service or playing back the media items on the at least one playback device of the media playback system. The controls may also cause other functions to occur with respect to the at least one playback device of the media playback system or the control device of the media playback system.

As noted above, the interface may include one or more controls for controlling the media playback system in various ways. Such controls may include a media-selection control for selecting media items of a streaming audio service. The computing device may add media items of the streaming audio service selected by way of the media-selection control on the interface of the second application media items to the playback queue of the media playback system.

As noted above, the playback device of the media playback system may maintain the playback queue of the media playback system. Accordingly, adding the selected media items to the playback queue may involve sending indications of the media items over a network to the at least one playback device of the media playback system. The at least one playback device may then retrieve the media items for playback from the streaming audio service.

The media-selection control may take a variety of forms. For instance, the media-selection control may include a search tool for searching metadata of media items to find particular media items for selection. The media-selection control may include indications of various media items suggested by the streaming audio service. The media-selection control may also include library controls for browsing media items available for streaming from the streaming audio service. Many other examples are possible.

Within examples, the interface of the second application may include one or more transport controls for controlling the media playback system. By way of such a transport control, the selected second application may assume control from the first application over one or more aspects of control of the media playback device. For instance, the second application may cause playback on the media playback system to play, pause, stop, skip forward, or skip back, among other examples. In some examples, the second application may control the media playback system by causing the computing device to send a command over a network to the at least one playback device of the media playback system. In other embodiments, the first application and the second application may have concurrent control over one or more aspects of the media playback system.

Figure 6B:
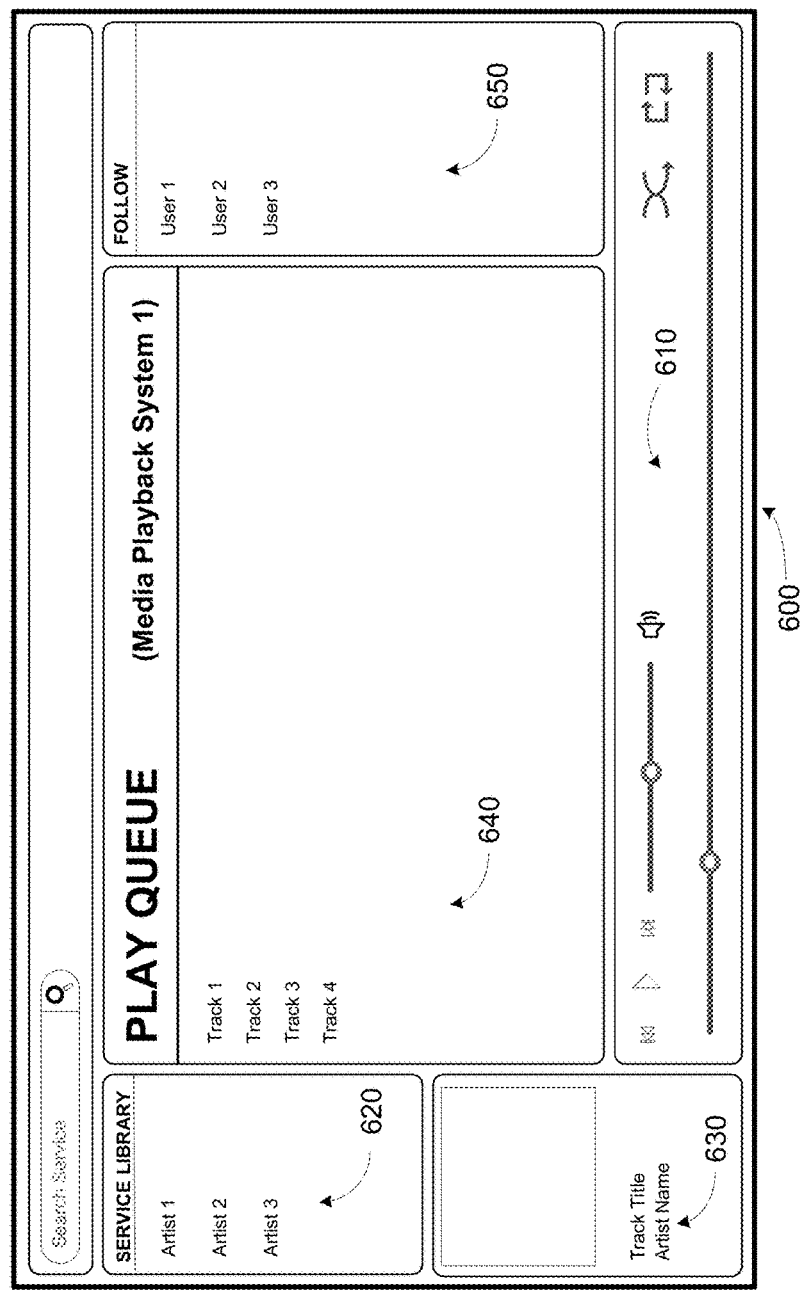

FIG. 6B illustrates an example interface 600, which is an example of an interface of the selected second application. Example interface 600 includes a playback control region 610, a media-selection control region 620, a playback status region 630, a playback queue region 640, and a service specific region 650. The interface of the second application may include other regions as well.

The playback control region 610 includes one or more transport controls for controlling playback. Such controls may include selectable (e.g., by way of touch or by using a cursor) icons to play or pause, fast forward, rewind, skip to next, skip to previous, enter/exit shuffle mode, enter/exit repeat mode, enter/exit cross fade mode. In some cases, the playback control region 610 may also include selectable icons to modify equalization settings, and playback volume, among other possibilities. In some cases, the playback control region 610 may provide controls for controlling playback on the media playback system. The playback control region 610 may also provide controls for controlling playback on the computing device. Within examples, the playback control region 610 may alternate or switch between control of the media playback system and control of playback on the computing device.

The playback control region 610 may provide controls that vary depending on certain conditions. For instance, the playback control region 610 may provide controls for controlling the media playback system when the computing device is in range of the media playback system, such as when the computing device detects connection to the same local area network as the media playback system or when the computing device detects, based on GPS data, that the computing device is close to the media playback system. In other cases, the playback control region 610 may provide controls for controlling playback on the computing device. In another example, the playback control region 610 may provide controls for controlling the media playback system the media playback system is selected as a target for playback of media items (e.g., a playlist of media items). Other arrangements are possible as well.

The media-selection control region 620 may provide controls for browsing media items available through the streaming audio service associated with the application. Such a media-selection control region 620 may include one or more lists of available artists, tracks, albums, and the like that indicate media items the streaming audio service has available to stream in its media library. As shown, such a media-selection control region 620 may also include a search input for searching the media library. Media items in the media library of the streaming audio service may be added to a queue of the media playback system for playback on the media playback system, or to a queue or playlist for playback on the computing device.

The playback status region 630 may include graphical representations of a media item that is presently being played, previously played, or scheduled to play next on the media playback system. In some cases, the playback status region 630 may include a graphical representation of a media item that is presently being played, previously played, or scheduled to play next on the computing device. The graphical representation of either the media playback system or the computing device may depend on the currently active playback target (e.g., either the media playback system or the playback device).

The playback queue region 640 may include graphical representations of audio content in a playback queue associated with the media playback system. Depending on the currently active playback target, the playback queue region 640 may alternatively include graphical representations of audio content in a playback queue associated with the computing device.

The service specific region 650 may include graphical representations that provide access to features of the streaming media service that may be specific to the streaming media service. Such features may be unavailable when controlling the media playback system by way of the interface of the first application. As shown, such features may include the capability to "follow" users of the streaming audio service and thereby have access to browse or playback playlists created by those followed users. Wide varieties of service-specific features are possible and may vary among streaming audio services.

An API may facilitate access to the media playback. The media playback system may recognize commands that conform to the API. The second application may cause the computing device to send such commands to the at least one playback device. As noted above, the second application may send such commands to the media playback system to effect control of the media playback system. For instance, such commands may cause playback on the media playback system.

As noted above, the interface of the second application may include controls that cause functions on the control device of the media playback system. For instance, the interface of the second application may detect input at the at least one second control. Such input may include, for example, selection of a transport control, among other examples. The computing device may then update the first interface to provide an indication of the input at the second control. For instance, the computing device may update the playback control region 410 or playback status region 430 of interface 400B.

As another example, the interface of the second application may detect input on the at least one second control, such as on the media-selection control region 620. Such input may request playback of a particular media item on the media playback device. For instance, such input may request playback by way of adding the particular media item to a playback queue of the media playback system. Then, in response to the received input, the computing device may update the interface of the first application to indicate that the particular media item is playing on the media playback system, such as by displaying a graphical representation of the media item in playback status region 430 of interface 400B.

In some cases, the computing device may divide the graphical display into a first portion that includes the interface of the first application and a second portion that includes the interface of the second application. Such division of the graphical display may occur in response to executing the selected second application. In one implementation, the first portion may include the at least one first control for controlling playback on the media playback system and the second portion may include the at least one second control.

In some embodiments, the computing device may divide the graphical display into the first portion and the second portion based on a given orientation of the graphical display. For instance, in response to the selection of the one of the one or more second applications, the computing device may detect that the graphical display is in a portrait orientation or that the graphical display is in a landscape orientation. Then, in response to the detecting, the computing device may horizontally-divide or vertically-divide the graphical display into the first portion and the second portion.

FIG. 7B shows example interface 700B that is in a portrait orientation and vertically-divided into a first portion and a second portion. Interface 700B includes a first portion that may be an interface of a first application. The first portion that includes a transport control region 706B that includes one or more controls for controlling playback on the media playback system, which. Interface 700B also includes a second portion that may be an interface of a second application. The second portion includes a title region 702B that indicates that the service library of a streaming audio service is presently displayed. The second portion also includes a media-selection control region 704B for selecting media items of the streaming audio service for streaming to the media playback system.

In some examples, executing the selected second application may involve modifying playback of media by the media playback system according to a playback-setting of the selected second application. In such an example, the first application may provide control of playback on the media playback system, and the selected second application may modify the playback on the media playback system. Different parties may provide respective second applications that modify playback of the media playback system in different ways. In some implementations, after execution, the selected second application may modify playback of media without necessarily requiring additional input at an interface of the selected second application.

In one example, modifying playback of media may involve generating or changing a playback queue of the media playback system. For example, the computing device may cause the selected second application to generate a playback queue comprising indications of one or more media items (e.g., respective metadata and/or respective file locations of the one or more media items). In such a case, the computing device may request one or more playlists for playback by media playback systems from the third-party provider of the selected second application. As noted above, the computing device may generate or change a playback queue of the media playback system after executing the second application without necessarily requiring further input.

In some cases, a service provider may curate playlists of media items. In some cases, the curated playlists may be pre-determined, such as by a playlist curator or by an algorithm for selecting media items for inclusion in a playlist. In other cases, the curated playlists may be determined on the fly, such as with a live performance by a curator or by an algorithm that generates a playlist based on detected input. After receiving such a request for a playlist, the third-party provider may send a curated playlist to the media playback system. Then, the computing device may cause the media playback system to playback the generated playback queue.

In some cases, modifying playback of the media playback system may involve disabling certain aspects of the first application. For instance, the computing device may disable the at least one first control of the first application. The at least one second control of the second application may then replace the at least one first control with the at least one second control.

The computing device may display an indication of the disabled control. For instance, the computing device may cause a graphical display to display, within the interface of the first application, an indication that the selected second application is controlling the media playback system. In some examples, the computing device may cause display of such an indication while certain aspects of the first application, such as the at least one first control, are disabled.

Figure 6C:
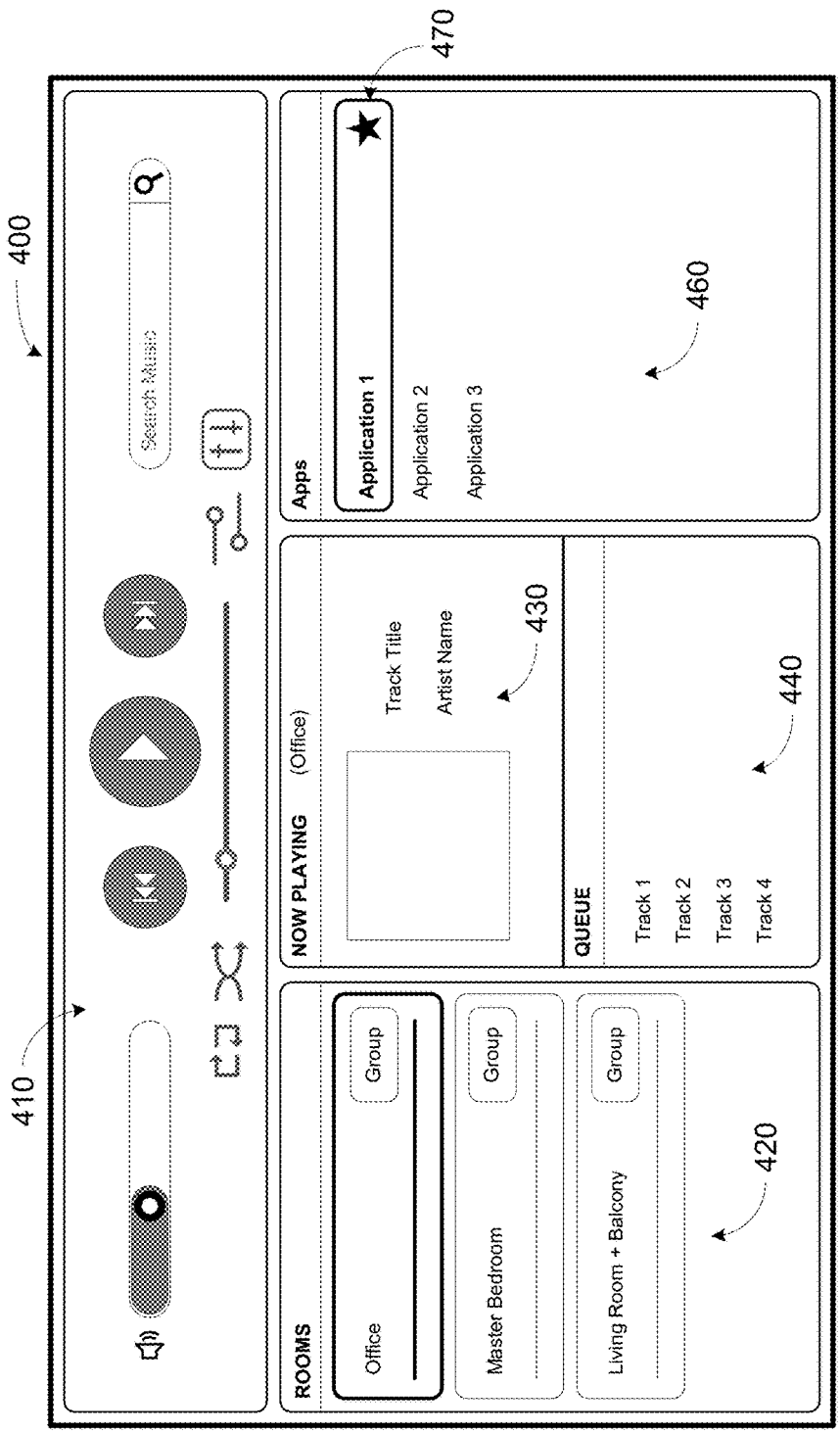

FIG. 6C shows example interface 400C, which could be another variation on user interface 400. In application selection region 460, interface 400C shows an indication that third-party application 1 has been selected. Further, interface 400C may indicate that selected third-party application 1 is presently controlling the media playback system, such as by displaying a star icon next to the indication of third-party application, as shown. Other indications are possible as well.

Within examples, modifying playback of the media playback system may involve modifying equalization of the playback device or media items played back by the playback device. In one example, the computing device may modify an equalization setting of one or more media items being played back by the media playback system. More particularly, the computing system may alter the media item to boost or cut frequencies of an audio signal of the media item. For instance, the computing system may boost or cut bass, mid-range, or treble frequencies, or may change a combination thereof. In some cases, the computing system may apply one or more filters to the audio signal of the media item to adjust frequencies of the audio signal. In another example, the computing device may modify an equalization setting of the at least one playback device. For instance, the computing system may enable or adjust one or more filters of the least one playback device, which may in turn cause adjustment of one or more frequency ranges of media items played by the at least one playback device. As noted above, the computing device may modify equalization of the playback device or media items played back by the playback device after executing the second application without necessarily requiring further input.

In some embodiments, the selected second application may change the playback-setting on the basis of the media item being played back by the media playback system. In one example, the media item being played back may have certain metadata associated therewith. Such metadata may identify, for the media item, a track name, an artist, an album, a genre, a label, and the like. The selected second application may change the playback-setting, and accordingly, the equalization, on the basis of this metadata (e.g., on the basis of track name, artist, album, genre, label and the like). For example, the selected second application may apply an equalization setting that boosts bass frequencies for a particular artist, such as a rap artist. In another example, the selected second application may apply an equalization setting that boosts mid-range frequencies for a particular genre, such as classical. Many examples are possible.

As noted above, various parties may provide second applications. In one example, a music label that specializes in rap music may provide a second application that provides equalization settings for its signed artists. Then, when that second application is selected, the second application may apply one or more equalization settings when media items by the music label's artists are played back by the media playback system. The music label's second application may provide the same equalization setting for all of its artists, or the second application may provide equalization settings that vary based on track name, artist, album, genre, label and the like.

Executing the selected second application may be one of a variety of functions performed by the computing device based on the selection of the one of the one or more second applications. For instance, the computing device may install, configure, register, or otherwise set-up the second application in response to the selection of the one of the one or more second applications.

In some implementations, the computing device may use application launching to facilitate executing the second application. Application launching refers to the practice of an operating system supporting the ability for applications to register a URL scheme with the operating system. After registration, the operating system will handle a registered URL by automatically launching the registered application. For example, a music service focused on music criticism and commentary, music news, and artist interview (e.g., Pitchfork® Media) may provide a second application. Similar to other curating services, the music service may aggregate and curate content and may have access to media item identifiers without having access to the media item itself. The first application could launch the second application on the computing device using a URL scheme, such as:

"Service 1://whats_new?x-callback-url=sonos://play-song&sonosSvcs=ServiceApp1".

As noted above, in some instances, the computing device may install the selected second application on the computing device based on the selection of one of the one or more second applications. Installing the selected second application may involve copying components of the selected second application to data storage on the computing device. In some examples, installing the selected second application may involve retrieving the selected second application from data storage and then installing the selected second application on the computing device. After installing the selected second application, the computing device may execute the application.

In other cases, the selected second application may be remotely-available from a second computing device over a network, such as the Internet. In such cases, the computing device may send, via a network interface, a request for the selected second application to be sent to the computing device. For instance, the computing device may send a request to download the selected second application from a server provided by the streaming audio service. Alternatively, the computing device may request an application store, such as the Apple App Store® or the Google Play Store®, to send the selected second application to the computing device for installation. The computing device may send the request based on the selection of the one of the one or more second applications. Then, after sending the request for the selected second application to be sent to the computing device, the computing device may receive the selected second application.

As noted above, the computing device may register an account (i.e., the account of the media playback system, which may represent a user) with the third-party provider of a streaming audio service associated with the selected second application. For instance, the computing device may retrieve, from data storage, data indicating user credentials (e.g., a username and password) for registering an account with the media playback system. Such user credentials may be used by the first-party to distinguish media playback systems among accounts, such as to provide account-specific preferences and services in association with the media playback system. The computing device may send a request to register the selected second application with a streaming audio service. The request may include the user credentials for registering the account with the media playback system. Then, upon registering the selected second application, the media playback system is registered to a particular account, such that the selected second application and third-party provider of the streaming audio service can match an account to a media playback system, among other possible benefits. Such matching of accounts to media playback systems may result in personalization on a per-user basis.

Also as noted above, the computing device may configure the selected second application, perhaps with user preferences. For example, the computing device may retrieve, from data storage, data indicating user preferences for a streaming audio service associated with the selected second application. Such user preferences may have been pre-configured and saved during use of the selected second application on the computing device, or on another computing device. The computing device may then, before executing the selected second application, configure the selected second application with the retrieved user preferences. Then, the computing device may execute the selected second application according to the user preferences. In one example, the user preferences may include saved playlists containing media items available from the streaming audio service. In other cases, based on the selection of the one of the one or more second applications, the computing device may send a request for user preferences for a streaming audio service associated with the selected second application. For instance, the computing device may request user preferences from the third-party provider of the streaming audio service. The computing device may then receive the user preferences from a second computing device, such as a server of the third-party provider. The computing device may then, before executing the selected second application, configure the selected second application with the retrieved user preferences.

IV. Example Method To Suggest Streaming Audio Services

As discussed above, embodiments described herein may involve first-party applications (e.g., first applications) and third-party applications (e.g., second applications). An example method may facilitate a suggested streaming audio service. A third-party application may provide access to such a suggested streaming audio service.

Figure 8:
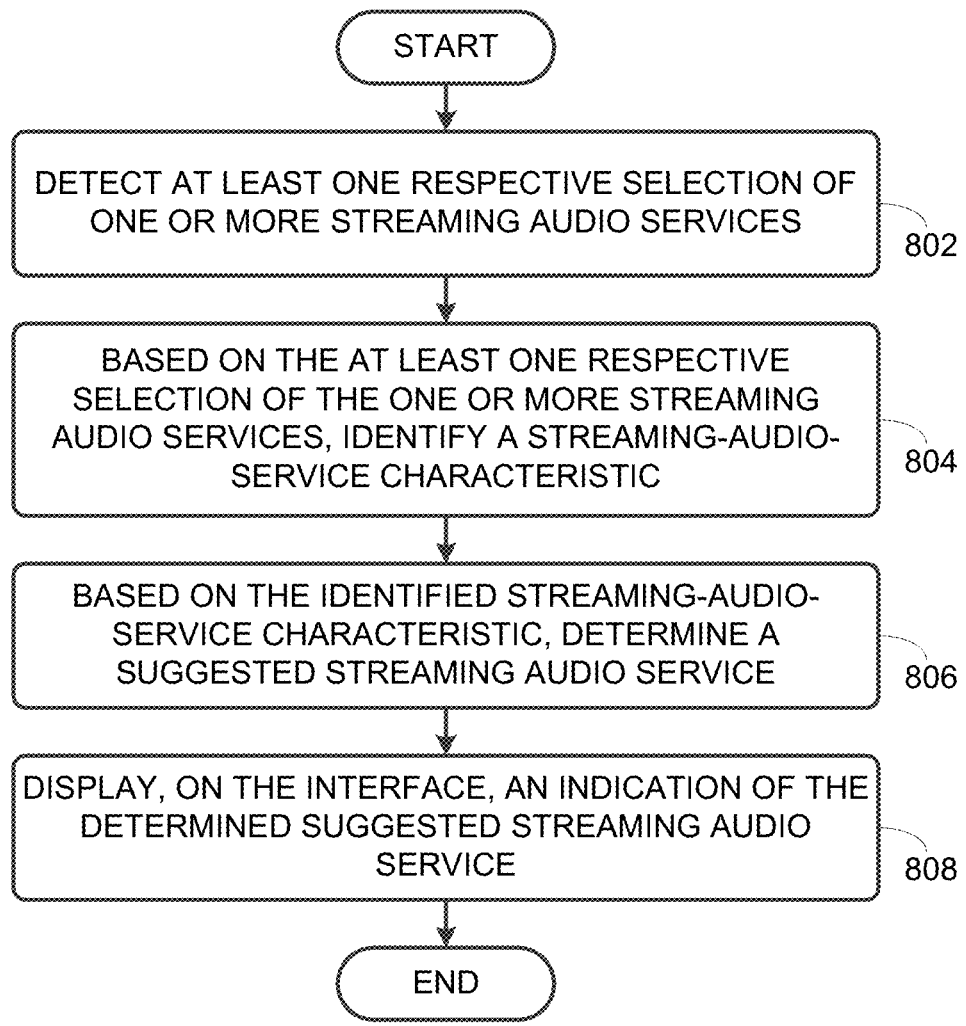
FIG. 8 shows an example flow diagram for suggesting a streaming audio service.

Method 800 shown in FIG. 8 presents an embodiment of a method that can be implemented within an operating environment involving, for example, the media playback system 100 of FIG. 1, one or more of the playback device 200 of FIG. 2, and one or more of the control device 300 of FIG. 3. Method 800 may include one or more operations, functions, or actions as illustrated by one or more of blocks 802-808. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

a. Detect at Least One Respective Selection of One or more Streaming Audio Services At block 802, the method involves detecting, within an interface of a first application, at least one respective selection of one or more streaming audio services. The selection may involve the computing device receiving an indication of one of the one or more second applications. For instance, the computing device may receive user input at a user interface, such as user interface 308 of control device 300 in FIG. 3. The computing device may then detect such user input and determine that the detected input is a selection of one of the one or more second applications.

Within examples, detecting at least one respective selection of one or more streaming audio services may involve detecting respective selections of one or more second applications. The second applications may be associated with respective streaming audio services. For instance, a particular second application may provide access to a streaming audio service. Interface 700A of FIG. 7A shows an example an application selection region 704A in which the computing device may detect selections of second applications.

In some examples, detecting at least one respective selection of one or more streaming audio services may involve tracking respective selections of one or more streaming audio services over a pre-determined period of time. Such tracking may involve detecting input that selects streaming audio services, and updating data to reflect a record of the detected input. Further, such tracking may generate records indicating which streaming audio services (or second applications associated with such streaming audio services) are likely to be selected. Further, in some implementations, the computing device may track respective times of day in which the at least one respective selection of one or more streaming audio services occurred. For example, such tracking may generate records indicating the frequency that each streaming audio service is selected during any period of time, such as a half hour. In one instance, such records may indicate that the computing device detected selection of a particular streaming audio service five times during the past week in the period of time between 5 pm and 5:30 pm. Such a record may result from a user inputting a selection of the particular streaming audio service in order to listen to the streaming audio service on the user's commute home from work.

In addition, the computing system may detect input opting into tracking the respective selections of one or more streaming audio services. Such input may indicate permission to track the selections in order to facilitate providing suggested streaming audio services. Such input may take a variety of different forms, such as a selection of an option in a preferences menu, among other examples.

b. Identify a Streaming-Audio-Service Characteristic

At block 804, the method involves identifying a streaming-audio-service characteristic based on the at least one respective selection of the one or more streaming audio services. The computing device may maintain or have access to data identifying respective characteristics of the one or more streaming audio services. Identifying a streaming-audio-service characteristic may involve determining which respective characteristic is most-common among the selected one or more streaming audio services.

The streaming-audio-service characteristic may take a variety of different forms. For example, the streaming-audio-service characteristic may identify a particular type of third-party audio streaming service, such as a streaming radio service or a jukebox service. In another example, the streaming-audio-service characteristic may be a music genre specialization of the streaming audio service. For instance, one streaming audio service may specialize in rap music, while other streaming audio services may specialize in classical music or indie music. As yet another example, the streaming-audio-service characteristic may identify whether the streaming audio service is free (e.g., ad-supported) or paid (e.g., subscription-based).

As noted above, the computing device may track respective times of day in which the at least one respective selection of one or more streaming audio services occurred. The computing device may correlate the tracked respective times of day to the identified streaming-audio-service characteristic, such that the streaming-audio-service characteristic is correlated to one or more respective times of day in which a streaming audio service matching the streaming-audio-service characteristic tends to be selected.

c. Determine a Suggested Streaming Audio Service

At block 806, the method involves determining a suggested streaming audio service based on the identified streaming-audio-service characteristic.

Determining a suggested streaming audio service based on the identified streaming-audio-service characteristic may take a variety of different forms. For instance, the computing device may determine a suggested streaming service that that has the identified streaming-audio-service characteristic. In some examples, the computing device may determine a suggested streaming audio service that emphasizes the characteristic, such as a streaming audio service that specializes in a particular genre. In other cases, the computing device may receive data indicating streaming audio services that have arrangements with the first-party to suggest such streaming audio services. The computing device may then determine the suggested streaming audio service from among the streaming audio services that have arrangements with the first-party.

In some implementations, the suggested streaming audio service may be the same as the selected one or more streaming audio services. In other implementations, the suggested streaming audio service may be different from the selected one or more streaming audio services. For instance, the computing device may suggest a streaming audio service that is different from the selected one or more streaming audio services so as to introduce a new streaming audio service to a user.

In some implementations, the computing device may detect, at a particular time of day, a trigger that causes displaying the indication of the determined suggested streaming audio service. Such a trigger may be contextual based on the state of the computing device. For instance, the trigger may involve detecting the display an application selection region of the interface of the first application, such as application suggestion region 704A. In another example, the trigger may involve the computing device detecting, using GPS data, that the computing device in in a particular location, such as the user's home or at the last known location of the user's vehicle.

Then, based on the correlated respective times of day to the streaming-audio-service characteristic, the computing device may determine a streaming audio service that has at least one streaming-audio-service characteristic that matches the streaming-audio-service characteristic that tends to be selected during the particular time of day. For example, the computing device may detect that the computing device is in the last known location of the user's car at 5 pm. From such a location, the computing device may determine that the user is about to commute home. Then, the computing device may determine a streaming audio service to suggest that is similar to the streaming audio service typically selected on the user's commute home from work during the time period from 5 pm to 5:30 pm. While one example of a commute home triggering event has been noted by way of example, those having skill in the art will appreciate that many other situations could be triggers for suggesting a streaming audio service.

d. Display an Indication of the Suggested Steaming Audio Service

At block 808, the method involves displaying, on the interface of the first application, an indication of the determined suggested streaming audio service. For instance, the computing device may display a selectable icon within the interface of the first application. After displaying the indication of the determined suggested streaming audio service, the computing device may detect a selection of the suggested streaming audio service and then executed a second application corresponding to the suggested streaming audio service.

Figure 9:
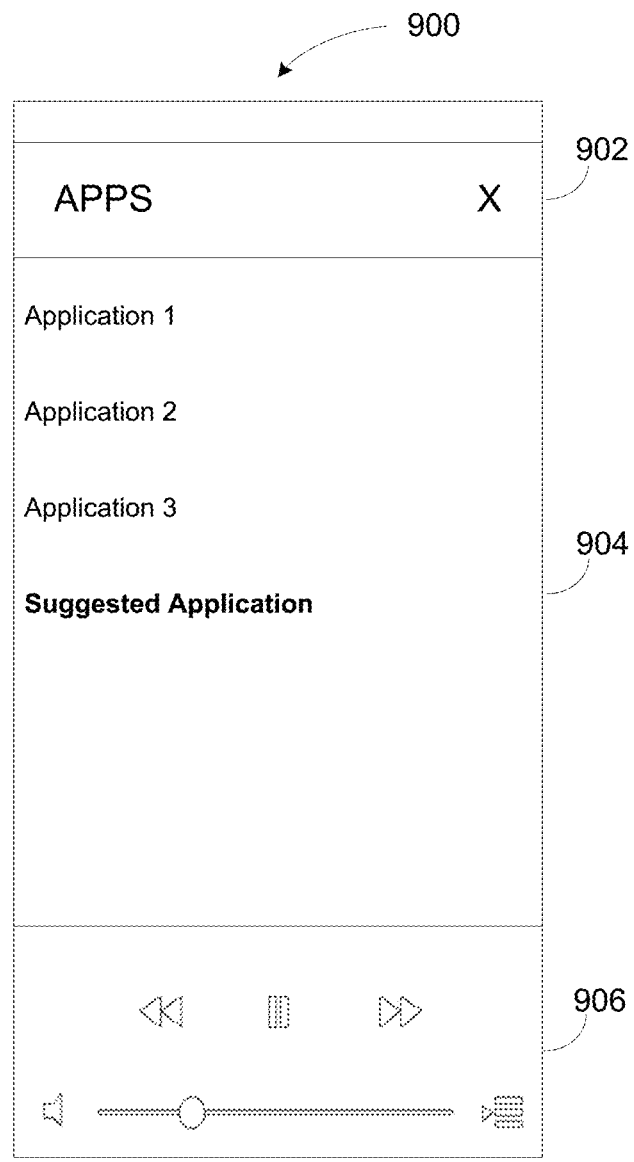
FIG. 9 shows an example interface in which aspects of certain embodiments may be practiced.

FIG. 9 shows an example interface 900, which could be a variation on example interface 700A. Example interface 900 includes a title region 902, an application selection region 904, and transport control region 906. The Apps selection region 904 includes indications of "Application 1", "Application 2", and "Application 3", which may correspond to respective applications for respective third-party services. The applications selection region 904 also includes an indication of a "Suggested Third-Party Application," as shown. Such an indication may be a selectable area or icon.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves first-party applications (e.g., first applications) and third-party applications (e.g., second applications). In one aspect, a method is provided. The method involves displaying, on the graphical display, an interface of a first application, where the interface of the first application includes (i) an indication of one or more second applications and (ii) at least one first control for controlling playback on a media playback system, where the media playback system includes at least one playback device. The method also involves detecting a selection of one of the one or more second applications. Based on detecting the selection of one of the one or more second applications, the method further involves: installing the selected second application on the computing device, and after installing the selected second application, executing the selected second application, where execution of the selected second application involves: displaying, on the graphical display of the computing device, an interface of the selected second application, where the interface of the selected second application includes at least one second control for controlling playback on the media playback system.

In another aspect, a device is provided. The device includes a network interface, a graphical display, a processor, a data storage; and a program logic stored in the data storage and executable by the processor to perform functions. The functions include displaying, on the graphical display, an interface of a first application, where the interface of the first application includes (i) an indication of one or more second applications and (ii) at least one first control for controlling playback on a media playback system, where the media playback system includes at least one playback device. The functions also include detecting a selection of one of the one or more second applications. Based on detecting the selection of one of the one or more second applications, the function further include: installing the selected second application on the computing device; and after installing the selected second application, executing the selected second application, where execution of the selected second application involves: displaying, on the graphical display of the computing device, an interface of the selected second application, where the interface of the selected second application includes at least one second control for controlling playback on the media playback system.

In yet another aspect, a non-transitory computer readable memory is provided. The non-transitory computer readable memory has stored thereon instructions executable by a computing device to cause the computing device to perform functions. The functions include displaying, on the graphical display, an interface of a first application, where the interface of the first application includes (i) an indication of one or more second applications and (ii) at least one first control for controlling playback on a media playback system, where the media playback system includes at least one playback device. The functions also include detecting a selection of one of the one or more second applications. Based on detecting the selection of one of the one or more second applications, the function further include: installing the selected second application on the computing device; and after installing the selected second application, executing the selected second application, where execution of the selected second application involves: displaying, on the graphical display of the computing device, an interface of the selected second application, where the interface of the selected second application includes at least one second control for controlling playback on the media playback system.

In an aspect, a second method is provided. The second method involves displaying, on a graphical display of a computing device, an interface of a first application, where the interface of the first application includes (i) an indication of one or more second applications and (ii) at least one first control for controlling playback on a media playback system, where the media playback system includes at least one playback device. The method also involves detecting, by the computing device, a selection of one of the one or more second applications. Based on detecting the selection of one of the one or more second applications, the method further involves executing, by the computing device, the selected second application, where execution of the selected second application involves modifying playback of media by the media playback system according to a playback-setting of the selected second application.

In another aspect, a second device is provided. The second device includes a network interface, a graphical display, a processor, a data storage, and a program logic stored in the data storage and executable by the processor to perform functions, the functions include displaying, on a graphical display of a computing device, an interface of a first application, where the interface of the first application includes (i) an indication of one or more second applications and (ii) at least one first control for controlling playback on a media playback system, where the media playback system includes at least one playback device. The functions also include detecting, by the computing device, a selection of one of the one or more second applications. Based on detecting the selection of one of the one or more second applications, the functions also include executing, by the computing device, the selected second application, where execution of the selected second application involves modifying playback of media by the media playback system according to a playback-setting of the selected second application.

In yet another aspect, a second non-transitory computer readable memory is provided. The non-transitory computer readable memory has stored thereon instructions executable by a computing device to cause the computing device to perform functions. The functions include displaying, on a graphical display of a computing device, an interface of a first application, where the interface of the first application includes (i) an indication of one or more second applications and (ii) at least one first control for controlling playback on a media playback system, where the media playback system includes at least one playback device. The functions also include detecting, by the computing device, a selection of one of the one or more second applications. Based on detecting the selection of one of the one or more second applications, the functions also include executing, by the computing device, the selected second application, where execution of the selected second application involves modifying playback of media by the media playback system according to a playback-setting of the selected second application.

In an aspect, a third method is provided. The third method involves detecting, within an interface of a first application, at least one respective selection of one or more streaming audio services, where the interface includes controls for controlling playback on a media playback system, and where the media playback system includes at least one playback device. Based on the at least one respective selection of the one or more streaming audio services, the method also involves identifying a streaming-audio-service characteristic; based on the identified streaming-audio-service characteristic. The method further involves determining a suggested streaming audio service, and displaying, on the interface, an indication of the determined suggested streaming audio service.

In another aspect, a third device is provided. The third device includes a network interface, a graphical display, a processor, a data storage, and a program logic stored in the data storage and executable by the processor to perform functions. The functions include detecting, within an interface of a first application, at least one respective selection of one or more streaming audio services, where the interface includes controls for controlling playback on a media playback system, and where the media playback system includes at least one playback device. Based on the at least one respective selection of the one or more streaming audio services, the functions also include identifying a streaming-audio-service characteristic; based on the identified streaming-audio-service characteristic. The functions further include determining a suggested streaming audio service, and displaying, on the interface, an indication of the determined suggested streaming audio service.

In yet another aspect, a third non-transitory computer readable memory is provided. The non-transitory computer readable memory has stored thereon instructions executable by a computing device to cause the computing device to perform functions. The functions include detecting, within an interface of a first application, at least one respective selection of one or more streaming audio services, where the interface includes controls for controlling playback on a media playback system, and where the media playback system includes at least one playback device. Based on the at least one respective selection of the one or more streaming audio services, the functions also include identifying a streaming-audio-service characteristic; based on the identified streaming-audio-service characteristic. The functions further include determining a suggested streaming audio service, and displaying, on the interface, an indication of the determined suggested streaming audio service.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method comprising:
   detecting, via a controller device, a first input in a control interface of a first application;
   based on the first input, sending, via a controller device over a local area network (LAN) to a media playback system, a command that instructs the media playback system to play back media provided by a first streaming audio service;
   displaying in the control interface of the first application, via the controller device, an indication of a suggested second application that is operable to provide access to a second streaming audio service that is different from the first streaming audio service;
   detecting, via the controller device, a second input in the first application, wherein the second input comprises a selection of the suggested second application; and
   based on the second input, causing, via the controller device, the controller device to download the suggested second application to a data storage of the controller device.

2. The method of claim 1, wherein causing the controller device to download the suggested second application comprises causing the controller device to request to download the suggested second application from a server of the second streaming audio service.

3. The method of claim 1, wherein causing the controller device to download the suggested second application comprises causing the controller device to request that an application store send the suggested second application to the controller device.

4. The method of claim 1, further comprising:
   after downloading the suggested second application, causing the controller device to execute the suggested second application.

5. The method of claim 1, further comprising:
   after downloading the suggested second application, detecting, via the controller device, a third input in the control interface of the first application; and
   based on the third input, sending, via the controller device over the LAN to the media playback system, a command that instructs the media playback system to play back media provided by the second streaming audio service.

6. The method of claim 1, further comprising:
   after downloading the suggested second application, displaying in the first application, via the controller device, an indication that media is available for playback from the second streaming audio service.

7. The method of claim 1, further comprising:
   before displaying in the first application the indication of the suggested second application, identifying, via the controller device, the suggested second application based on at least one streaming-audio-service characteristic of the second streaming audio service.

8. The method of claim 1, further comprising:
   after downloading the suggested second application, retrieving, via the controller device, at least one credential associated with the first streaming audio service from data storage; and
   registering, via the controller device, the second streaming audio service with the media playback system using, at least in part, the at least one credential.

9. The method of claim 1, further comprising:
   after downloading the suggested second application, retrieving, via the controller device, at least one user preference associated with the first streaming audio service from data storage; and
   configuring, via the controller device, the suggested second application with the retrieved at least one user preference.

10. A non-transitory computer-readable medium having stored therein instructions executable by one or more processors to cause a controller device to perform operations comprising:
    detecting a first input in a control interface of a first application;
    based on the first input, sending, via a controller device over a local area network (LAN) to a media playback system, a command that instructs the media playback system to play back media provided by a first streaming audio service;
    displaying in the control interface of the first application, via the controller device, an indication of a suggested second application that is operable to provide access to a second streaming audio service that is different from the first streaming audio service;
    detecting, via the controller device, a second input in the first application, wherein the second input comprises a selection of the suggested second application; and
    based on the second input, causing, via the controller device, the controller device to download the suggested second application to a data storage of the controller device.

11. The non-transitory computer-readable medium of claim 10, wherein causing the controller device to download the suggested second application comprises causing the controller device to request to download the suggested second application from a server of the second streaming audio service.

12. The non-transitory computer-readable medium of claim 10, wherein causing the controller device to download the suggested second application comprises causing the controller device to request that an application store send the suggested second application to the controller device.

13. The non-transitory computer-readable medium of claim 10, wherein the operations further comprise:
    after downloading the suggested second application, causing the controller device to execute the suggested second application.

14. The non-transitory computer-readable medium of claim 10, wherein the operations further comprise:
    after downloading the suggested second application, detecting, via the controller device, a third input in the control interface of the first application; and
    based on the third input, sending, via the controller device over the LAN to the media playback system, a command that instructs the media playback system to play back media provided by the second streaming audio service.

15. The non-transitory computer-readable medium of claim 10, wherein the operations further comprise:
    after downloading the suggested second application, displaying in the first application, via the controller device, an indication that media is available for playback from the second streaming audio service.

16. The non-transitory computer-readable medium of claim 10, wherein the operations further comprise:
before displaying in the first application the indication of the suggested second application, determining, via the controller device, that the suggested second application is the suggested second application based on at least one streaming-audio-service characteristic of the second streaming audio service.

17. The non-transitory computer-readable medium of claim 10, wherein the operations further comprise:
after downloading the suggested second application, retrieving, via the controller device, at least one credential associated with the first streaming audio service from data storage; and
registering, via the controller device, the second streaming audio service with the media playback system using, at least in part, the at least one credential.

18. The non-transitory computer-readable medium of claim 10, wherein the operations further comprise:
after downloading the suggested second application, retrieving, via the controller device, at least one user preference associated with the first streaming audio service from data storage; and
configuring, via the controller device, the suggested second application with the retrieved at least one user preference.

19. A controller device comprising:
a graphical interface;
a network interface;
one or more processors;
data storage having stored therein instructions executable by the one or more processors to cause the controller device to perform operations comprising:
displaying, on the graphical interface, a control interface of a first application;
detecting a first input in the control interface of the first application;
based on the first input, sending, via a controller device over a local area network (LAN) to a media playback system, a command that instructs the media playback system to play back media provided by a first streaming audio service;
displaying in the control interface of the first application, via the controller device, an indication of a suggested second application that is operable to provide access to a second streaming audio service that is different from the first streaming audio service;
detecting, via the controller device, a second input in the first application, wherein the second input comprises a selection of the suggested second application; and
based on the second input, causing, via the controller device, the controller device to download the suggested second application to the data storage of the controller device.

20. The controller device of claim 19, wherein the operations further comprise:
after downloading the suggested second application, detecting a third input in the control interface of the first application; and
based on the third input, sending, over the LAN to the media playback system, a command that instructs the media playback system to play back media provided by the second streaming audio service.

* * * * *